(No Model.)
E. R. PROCTER.
SEED OR CORN PLANTER.
No. 347,825. Patented Aug. 24, 1886.
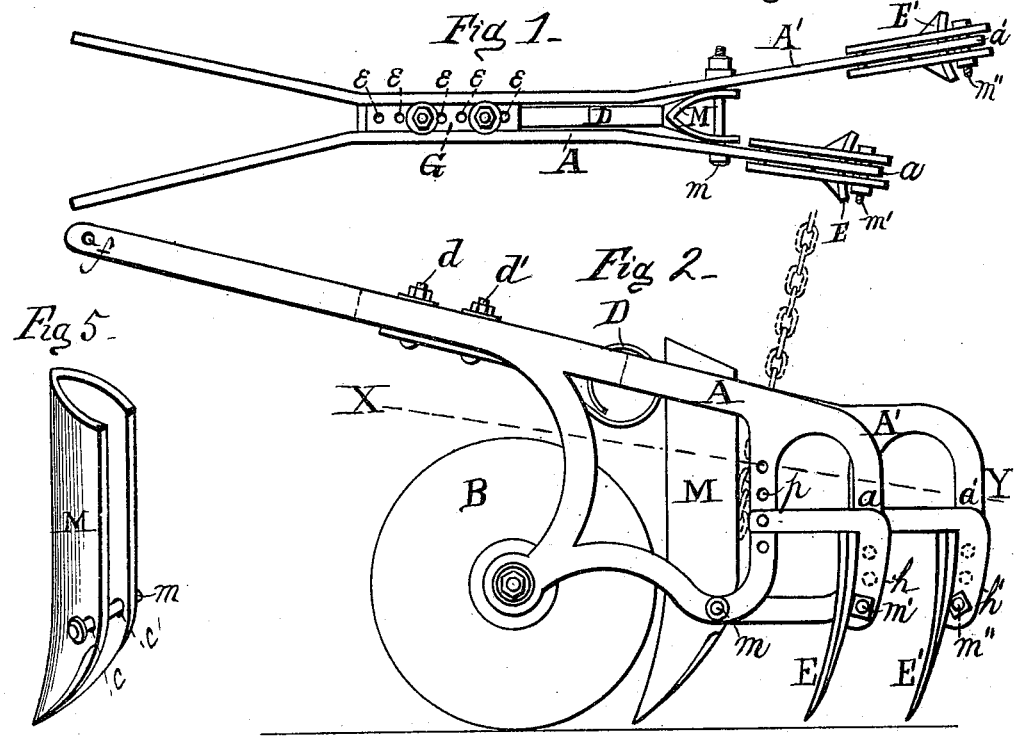
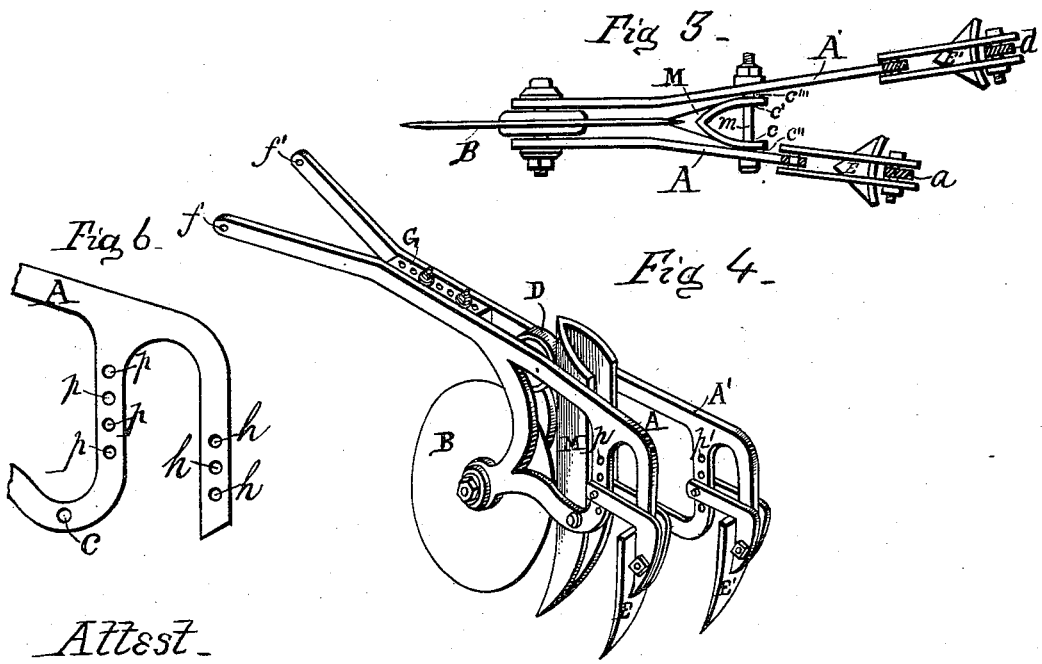
Attest
H. B. Maynard
Walter E. Maynard
Inventor
Edwin R. Procter

UNITED STATES PATENT OFFICE.

EDWIN R. PROCTER, OF WASHINGTON COURT-HOUSE, OHIO.

SEED OR CORN PLANTER.

SPECIFICATION forming part of Letters Patent No. 347,825, dated August 24, 1886.

Application filed January 13, 1886. Serial No. 188,447. (No model.)

*To all whom it may concern:*

Be it known that I, EDWIN R. PROCTER, of Washington Court-House, Fayette county, Ohio, have invented a new and useful Improvement in Seed or Corn Planters, of which the following is a specification.

My invention relates to improvements in that class of seed or corn planters or grain-drilling machines in which shoes, shovels, or runners carried by drag-bars or other means are arranged to open furrows for the seed which is deposited behind said shovels.

The objects of my improvement are, first, to provide, in combination with an improved shoe, shovel, or furrow-opener, a trash-cutter, which, in a manner superior to the ordinary planter or drill runner or shoe, cuts the trash, stalks, or obstructions both above and beneath the surface of the ground, divides the soil in advance of the shovel, assists in the penetration of latter, and insures lighter draft and a more uniform depth of planting; second, to provide, in combination with a rolling cutter and improved furrow-opener, a positive covering to the seed deposited behind the latter, so that there may be no occasional uncovered hills; third, to overcome in a two-wheeled planter or drilling-machine of the class above specified the horse motion—to wit, the swinging of tongue of machine from side to side, and consequent momentary whirling of one wheel in advance of the other, to the detriment of straight driving and consequent straight line of seed-deposit, said horse motion, in two-wheeled machines of this class, being caused principally by the horses not pulling true and even and by obstructions appearing before one wheel or the other.

My device is especially applicable to my corn-planter of January 5, 1886, No. 333,547.

Figure 1 is a plan view of my invention. Fig. 2 is a side elevation of same. Fig. 3 is a horizontal section of same on line X Y, showing portions of drag-bars in section. Fig. 4 is a perspective view of my invention. Fig. 5 is a perspective view of the furrow-opener or shovel and its hinge-bolt. Fig. 6 is a side elevation of a fragment of the rear end of one of the drag-bars.

In the accompanying drawings, A A' represent the drag-bars attachable to frame, as customary, and M and B the shovel and rolling cutter, respectively, both being attached to said drag-bars A A', as hereinafter described.

In the sides of shovel M, near the point of same, are the holes *c c'*, for reception of draft or hinge bolt *m*, on which is hung the shovel M, between the drag-bars A A', and to which may be fastened any suitable lifting device, but chains preferably. The bolt *m*, from its low position in shovel M, serves to prevent the point of latter from deviating much from the proper position requisite for accurate seed-delivery. The bolt *m* also serves to retain the customary vertical india-rubber tube or seed-conductor in position between the interior sides of shovel M, thus avoiding the use of tubular shoes, which are liable to become clogged or stopped up at hole in the bottom when planting or sowing heavy wet land. Again, the draft-bolt *m* being located close to the bottom of shovel M, and the latter being open in the rear, it allows the customary rubber tube to hang straight and undistorted, even during such times as the top of shovel may be, by obstructions at point of same, pitched forward, whereas when a tubular shoe is used the rubber tube is liable at such times to be bent over and kinked against the rear of top interior edge of said tubular shoe, so as to check the full flow of seed.

Holes *f f'* are for attachment of the drag-bars to frame.

The angularity of the shovel M is regulated by the adjustment of spring D forward or backward on the drag-bars A A', which is accomplished by changing the bolts *d d'* in the series of holes *e* in the block G, fastened between drag-bars A A'.

The depth of penetration of shovel M is determined by the depth of cut made by the rolling cutter B in advance of it.

The depth of cut to be made by the rolling cutter B is regulated by raising or lowering the covering-shovels E E' on the drag-bars A A' by changing the bolts *m'* and *m''* in the series of holes *h h'* in the ends *a a'* of the drag-bars A A'. For example, to cause the cutter B to cut deep, fasten the shovels E E' to the upper holes of the series *h h'*, which will raise the points of the shovels E E' out of and above the horizontal plane common to the lower edge of B, point of M, and points of E E' during ordinary use, and throw the weight of the said shovels E E' largely on the axle of cutter B, thus pressing the said cutter B into the ground to a depth sufficient ordinarily to let the points of shovels E E' drag on the ground.

The holes $c''$ $c'''$ in drag-bars A A', for reception of draft-bolt $m$, are located close to the ground in drag-bars A A', so that the draft may be as direct as possible upon the drag-bars A A', and not upon the spring D, or at least only a very slight pressure upon the latter when the cutter and shovel M are passing through even ground.

Obviously, when the point of shovel M strikes an obstruction, the spring D is slightly compressed, and forces shovel M back to its proper position as soon as the obstruction is passed.

I use phrase "slightly compressed," since the wheel-cutter B, immediately in front of shovel M, rides over large obstructions, carrying over the shovel M on its back, as it were, whereas the same large obstructions would greatly compress the spring of an ordinary spring shoe or shovel not so forearmed.

In my device the wheel-cutter protects the shovel, while the ordinary naked shoe or shovel has to bear the brunt of the blow from obstructions in its path. The rolling cutter B may be attached to or between the drag-bars A A' in any suitable manner.

The series of holes $p$ and $p'$ in drag-bars A A' are break-pin holes. The covering shovels E E' have each of them forwardly-extending arms perforated near front ends, which embrace between said ends the drag-bars A A', and besides being vertically adjustable, as described, may have their angularity changed by changing their break-pins in the series of holes $p$ and $p'$, thus regulating their penetration of the soil. The shovels E E' are "dodged," as shown, by the prolongation of one end, $a'$, of the drag-bars, the shovel on the prolonged bar running to rearward of other covering shovel, to prevent trash accumulating, as well as to help elongate the gang in the line of draft, so as to steady the tongue of machine, and thus assist in overcoming the horse motion.

In using the ordinary planter or drill runner or shoe, it is common on irregular ground for seed to be left uncovered if deposited in a hollow, whereas my combined trash-cutter and shovel, being peculiarly well adapted in themselves for such ground, and also being attached to drag-bars, readily sink into such hollows, and the covering-shovels attached to same drag-bars scrape the soil over the seed and can never fail to cover.

I overcome the horse motion mentioned above, and characteristic of two-wheeled machines of this class, in the following described manner: The dragging in the loose earth of the gang of four cutting edges or points—to wit, the cutter, the furrow-opener, the front shovel and the rear shovel, the one gradually in advance of the other and all in the line of draft—obviously makes, where two or more gangs are used in the machine, a decided resistance to the lateral motion of the tongue, proportioned to the number of gangs used, since each slight turn of the point of the tongue, to the left, for instance, (as from clod under left wheel,) is met by a lateral resistance of the earth on the left side of the cutter, and there will be a similar resistance on the right side of the rearmost implement of the same gang, and vice versa, when the tongue points to the right, and thus the tongue ceases to pull the horses' necks from side to side, but preserves its forward straight direction and helps the driver to maintain the straight line of planting, each gang acting as a rudder or help to this end.

I am aware that drill shoes having a plate projecting from the front upper end of shoe, said plate having two series of holes therein for vertical and angular adjustment of the shoe, are old; and that similar drill-shoes with similar plates and provided with either metal or rubber springs in addition thereto are old; and that drill-shoes having said perforated front plate for adjustment of shoe, and said metal or rubber springs in addition thereto, have been made open in the rear, instead of tubular, and operating in conjunction with metallic tubes which are held in position and maintain their position in the concave shoes, despite position of shoes, by their own gravity. I therefore disclaim whatever my present device has in common with such devices.

I am also aware that corn-planters (Crandall, January 7, 1873, No. 134,521) have been made with vertically-adjustable coverers in pairs, said coverers connecting at their upper ends by the same fastening-bolt to a single beam or bar, the latter (which also carries the seed-box) attached at its forward end to the axle of machine; and that other corn-planters (Gregg, January 2, 1877, No. 185,915,) have been made with share or furrow-maker hung to a system of bars and levers, so as to confine it to a vertical movement, said share having a forwardly-extending integral frame, S, "giving journal-bearing to the rotating opener T," "said frame having hinge-connection with the draw-bar;" and that seed-drills (Anderson, October 7, 1879, No. 220,267) have been made with rotary colters carried between hangers that are separable from and adjustable upon the drag-bars, to which they and the drill-tooth are pivoted by a common bolt. I therefore disclaim invention in such features, broadly or separately considered.

I claim as new and of my invention—

1. The combination, in a seed or corn planter or grain-drilling machine, of a cutter, B, turning loosely in its bearings, and furrow opener or shovel M, swinging on bolt $m$, with the drag-bars A A', substantially as and for the purpose set forth.

2. The combination, in a corn-planter or grain-drill, of the drag-bars A A', having the block G, and the furrow-opener M, having the bolt $m$, with the adjustable spring D, controlling by pressure the forward movement of front of top of shovel M, substantially as shown, for the purpose specified.

3. The combination, in a corn-planter or grain-drill, of the drag-bars A A', having the block G, the rolling cutter B, and the shovel M, having the bolt $m$, with the adjustable spring D, controlling by pressure the forward movement of front of top of shovel M, substantially as shown, for the purpose specified.

4. The combination, in a corn-planter or grain-drill, of the cutter B, furrow-opener M, having the bolt $m$, and the vertically-adjustable covering-shovels E E', with the drag-bars A A', substantially as set forth.

5. The combination, in a corn-planter or grain-drill, of the cutter B, shovel M, having the bolt $m$, adjustable spring D, and the adjustable covering-shovels E E', with the drag-bars A A', having the block G, substantially as set forth.

6. The combination, in a corn-planter or grain-drilling machine, of a rolling cutter, B, and vertically-adjustable covering-shovels E E', with the rigid unjointed double drag-bars A A', said shovels E E' attaching separately one on each rear end of each drag-bar, substantially as set forth.

7. In a corn-planter or grain-drilling machine, the combination of a wheel or rolling cutter and rigid unjointed drag-bars, said rolling cutter being attached loosely to and between said rigid drag-bars, substantially as set forth.

8. The combination, in a corn-planter or grain-drill, with the drag-bars, of an open-back furrow opener, which is pivoted to and between the drag-bars by a pin or bolt penetrating the drag-bars and the sides of said furrow-opener, substantially as set forth.

9. The combination, in a corn-planter or grain-drill, of the rigid unjointed drag-bars and an open-back furrow opener, which is pivoted to and between said rigid drag-bars by a pin or bolt penetrating the said rigid drag-bars and the sides of said furrow-opener, with a rolling cutter attached to and between said rigid drag-bars and in advance of said furrow-opener, substantially as set forth.

10. The combination, in a corn-planter or grain-drill, of the rigid double drag-bars and an open-back furrow-opener, which is pivoted to and between said drag-bars by a bolt penetrating the said drag-bars and the sides of said furrow-opener, and a rolling cutter attached to said drag-bars, with covering-shovels attached to the rear ends of said drag-bars, substantially as set forth and described.

11. The combination, in a corn-planter or grain-drill, of the double drag-bars and an open-back furrow-opener pivoted to and between them by a bolt penetrating them and the sides of said furrow-opener, and a rolling cutter attached to said drag-bars, with covering-shovels attached to the rear ends of said drag-bars, and break-pinned to said drag-bars by means of forwardly-extending arms attached to said shovels, substantially as set forth.

12. The combination, in a corn-planter or grain-drill, of the double drag-bars and an open-back furrow-opener, which is pivoted to and between said drag-bars by a bolt penetrating the latter and the sides of said furrow-opener and controlled in the forward movement of its front top end by an adjustable spring having its free end located between said drag-bars, and a rolling cutter attached to said drag-bars, with covering-shovels attached to the rear ends of said drag-bars, and break-pinned to said drag-bars by means of forwardly-extending arms attached to said shovels, substantially as and for the purpose set forth.

13. The combination, in a corn-planter or grain-drill, of the cutter B, furrow-opener M, having the holes $c$ and $c'$ and the bolt $m$, and the vertically-adjustable covering-shovels E E', with the drag-bars A A', having the holes $c''$ and $c'''$ and the series of holes $h$ and $h'$, respectively, substantially as set forth.

14. The combination, in a corn-planter or grain-drill, of the drag-bars A A', having the holes $c''$ and $c'''$ and the series of holes $h$ and $h'$, and the block G, which has the series of holes $e$ and the bolts $d$ $d'$, the rolling-cutter B, the furrow-opener or shovel M, having the holes $c$ and $c'$ and the bolt $m$, and the adjustable covering-shovels E E', with the adjustable spring D, substantially as set forth.

15. The combination, in a corn-planter or grain-drill, of the drag-bars A A', having the holes $c''$ and $c'''$, and the series of holes $p$ and $p'$ and series of holes $h$ and $h'$, arranged, as described, for vertical and angular adjustment of the covering-shovels E E', the rolling cutter B, and the furrow-opener M, having the holes $c$ and $c'$, with the bolt $m$, substantially as and for the purpose set forth.

16. In a corn-planter or grain-drilling machine, the combination of a rolling cutter and an open-back furrow-opener with rigid double drag-bars, the said cutter and said opener being both attached loosely between said drag-bars, substantially as and for the purpose described.

17. The combination, in a corn-planter or grain-drilling machine, of a rolling cutter, an open-back furrow-opener, and two covering-shovels with double drag-bars, said cutter and said opener being both attached loosely between said drag-bars, and said shovels being attached separately, one on each rear end of each of said drag-bars, substantially as set forth.

EDWIN R. PROCTER.

Witnesses:
H. B. MAYNARD,
WALTER E. MAYNARD.